(12) United States Patent
Lee (10) Patent No.: US 11,294,201 B2
(45) Date of Patent: Apr. 5, 2022

(54) ORTHOKERATO LENS

(71) Applicant: Jung Hoon Lee, Daegu (KR)

(72) Inventor: Jung Hoon Lee, Daegu (KR)

( * ) Notice: Subject to any disclaimer, the term of this patent is extended or adjusted under 35 U.S.C. 154(b) by 100 days.

(21) Appl. No.: 16/876,145

(22) Filed: May 18, 2020

(65) Prior Publication Data

US 2021/0048687 A1    Feb. 18, 2021

(30) Foreign Application Priority Data

Aug. 14, 2019   (KR) .......................... 10-2019-0099886

(51) Int. Cl.
*G02C 7/04*        (2006.01)
(52) U.S. Cl.
CPC .............. *G02C 7/047* (2013.01); *G02C 7/048* (2013.01); *G02C 7/049* (2013.01)
(58) Field of Classification Search
CPC .......... G02C 7/047; G02C 7/048; G02C 7/049
USPC ........................................................ 351/212
See application file for complete search history.

(56) References Cited

U.S. PATENT DOCUMENTS

| | | | | |
|---|---|---|---|---|
| 5,270,051 A | * | 12/1993 | Harris | ..................... A61K 31/13 424/427 |
| 5,788,957 A | * | 8/1998 | Harris | ................... A61F 9/0017 424/423 |
| 6,537,545 B1 | * | 3/2003 | Karageozian | ......... A61F 9/0017 424/94.4 |

* cited by examiner

*Primary Examiner* — James R Greece
(74) *Attorney, Agent, or Firm* — JCIPRNET (57) ABSTRACT

Provided is an orthokerato lens including a central portion located on a center of a lens and configured to change a refractive index by pressurizing a cornea, a fitting portion configured to form a negative pressure between the lens and the cornea to pile epithelial cells moved from the central portion, a fixing portion configured to be in contact with an eyeball and align the lens such that the center of the lens is located at a center of the cornea, a peripheral portion configured to allow tears between the lens and the eyeball to circulate, and a circulation hole configured to penetrate the central portion.

9 Claims, 6 Drawing Sheets

ORTHOKERATO LENS

CROSS-REFERENCE TO RELATED APPLICATION(S)

This application claims the priority benefit of Korean Patent Application No. 10-2019-0099886 filed on Aug. 14, 2019, in the Korean Intellectual Property Office, the disclosure of which is incorporated herein by reference for all purposes.

BACKGROUND

Technical Field

The following description relates to an orthokerato lens.

Description of Related Art

An orthokerato lens is used as a non-surgical vision correction technique. A principle of vision correction of the orthokerato lens is to flatten a certain portion of a cornea by pressing the cornea with a lens to reduce a distance between center points of the cornea and a retina, which is a cause of myopia, so that an image is formed on the retina. If a user sleeps while wearing the orthokerato lens, a portion of the cornea may be pressurized during the sleep and thus, a refractive index of the cornea may be changed. As a result, myopia may be temporarily resolved and an image may be formed on the retina. However, when using the orthokerato lens, care should be taken for side effects such as pain or corneal edema caused by hypoxia keratitis. In particular, side effects caused by adhesion of the orthokerato lens should be prevented.

When eyes are closed during sleep, oxygen is supplied by oxygen released from blood vessels around the cornea. The released oxygen spreads through tears to the entire cornea. If the tears do not circulate smoothly, the orthokerato lens may adhere, which may lead to side effects such as hypoxia. Especially in the case of high myopia, the adhesion of the orthokerato lens may occur frequently. For example, on a cornea of high myopia, a phenomenon as if a lens is caught in a frame may occur as an amount of epithelium moving to a fitting part (e.g. a reverse curve) of the lens increases, which may lead to the adhesion of the lens. Also, in a case of severe dryness, the movement of the lens may be reduced as a lubricating action of the tears decreases, resulting in adhesion of the lens. Therefore, in terms of technology related to the orthokerato lens, the prevention of side effects due to the adhesion is important. For this, there is a desire for development of a lens having a structure in which tears between the lens and a cornea circulate smoothly.

The above-described background art is possessed or acquired by the inventor during the derivation process of the present disclosure, and is not necessarily a known technology disclosed to the public before the filing of the present disclosure.

SUMMARY

According to an aspect, there is provided an orthokerato lens including a central portion located on a center of a lens and configured to change a refractive index by pressurizing a cornea, a fitting portion configured to form a negative pressure between the lens and the cornea to pile epithelial cells moved from the central portion, a fixing portion configured to be in contact with an eyeball and align the lens such that the center of the lens is located at a center of the cornea, a peripheral portion configured to allow tears between the lens and the eyeball to circulate, and a circulation hole configured to penetrate the central portion.

A circulating path through which the tears circulate via the circulation hole and the peripheral portion may be pluralized between the lens and the eyeball.

The circulation hole may be formed at a center of the central portion.

The circulation hole may have a shape in which a diameter decreases from an outer surface of the lens toward an inner surface of the lens.

The circulation hole may have a shape in which a diameter increases from an outer surface of the lens toward an inner surface of the lens.

The circulation hole may have a shape in which a diameter is uniformed from an outer surface of the lens to an inner surface of the lens.

A plurality of circulation holes may be formed to be symmetric based on a center of the central portion.

The circulation hole may include a first circulation hole of which a diameter decreases from an outer surface of the lens toward an inner surface of the lens, and a second circulation hole of which a diameter increases from the outer surface of the lens toward the inner surface of the lens.

A center of curvature of the peripheral portion may be formed on an opposite side to a center of curvature of the fitting portion and a center of curvature of the central portion based on the lens. A radius of curvature of the peripheral portion is less than a radius of curvature of the fixing portion.

The tears may flow into the lens via at least one of the first circulation hole and the peripheral portion. The tears may come out of the lens via at least one of the second circulation hole and the peripheral portion.

According to another aspect, there is also provided an orthokerato lens including a central portion located on a center of a lens and configured to change a refractive index by pressurizing a cornea, a fitting portion configured to form a negative pressure between the lens and the cornea to pile epithelial cells moved from the central portion, a fixing portion configured to be in contact with an eyeball and align the lens such that the center of the lens is located at a center of the cornea, a peripheral portion having a center of curvature that is formed on an opposite side to a center of curvature of the fitting portion and a center of curvature of the central portion based on the lens and having a radius of curvature that is less than a radius of curvature of the fixing portion, and a circulation hole configured to penetrate the central portion.

A circulating path through which the tears circulate via the circulation hole and the peripheral portion may be pluralized between the lens and the eyeball.

The circulation hole may have a shape in which a diameter decreases from an outer surface of the lens toward an inner surface of the lens.

The circulation hole may have a shape in which a diameter increases from an outer surface of the lens toward an inner surface of the lens.

The circulation hole may have a shape in which a diameter is uniformed from an outer surface of the lens to an inner surface of the lens.

The circulating path may include a first path through which the tears flow into a space between the lens and the eyeball via the peripheral portion and come out via the circulation hole, and a second path through which the tears flow into a space between the lens and the eyeball via the circulation hole and come out via the peripheral portion.

The circulating path may further include a third path through which the tears flow into and come out of the space between the lens and the eyeball via the peripheral portion.

A plurality of circulation holes may be formed to be symmetric based on a center of the central portion. The circulating path may further include a fourth path through which the tears flow into and come out of the space between the lens and the eyeball via the plurality of circulation holes.

The circulation hole may include a first circulation hole having a shape in which a diameter gradually decreases from an outer surface of the lens toward an inner surface of the lens, to guide the tears from the outer surface of the lens toward the cornea, and a second circulation hole having a shape in which a diameter gradually increases from the outer surface of the lens toward the inner surface of the lens, to guide the tears from the cornea toward the outer surface of the lens. The tears may flow into the lens via at least one of the first circulation hole and the peripheral portion. The tears may come out of the lens via at least one of the second circulation hole and the peripheral portion.

A hole may not be formed in the fitting portion, the fixing portion, and the peripheral portion.

Additional aspects of example embodiments will be set forth in part in the description which follows and, in part, will be apparent from the description, or may be learned by practice of the disclosure.

BRIEF DESCRIPTION OF THE DRAWINGS

These and/or other aspects, features, and advantages of the invention will become apparent and more readily appreciated from the following description of example embodiments, taken in conjunction with the accompanying drawings of which.

DETAILED DESCRIPTION

Hereinafter, some example embodiments will be described in detail with reference to the accompanying drawings. Regarding the reference numerals assigned to the elements in the drawings, it should be noted that the same elements will be designated by the same reference numerals, wherever possible, even though they are shown in different drawings. Also, in the description of embodiments, detailed description of well-known related structures or functions will be omitted when it is deemed that such description will cause ambiguous interpretation of the present disclosure.

In addition, terms such as first, second, A, B, (a), (b), and the like may be used herein to describe components. Each of these terminologies is not used to define an essence, order or sequence of a corresponding component but used merely to distinguish the corresponding component from other component(s). It should be noted that if it is described in the specification that one component is "connected", "coupled", or "joined" to another component, a third component may be "connected", "coupled", and "joined" between the first and second components, although the first component may be directly connected, coupled or joined to the second component.

A component having a common function with a component included in one example embodiment is described using a like name in another example embodiment. Unless otherwise described, a description made in one example embodiment may be applicable to another example embodiment and a detailed description within a duplicate range is omitted.

Figure 1:
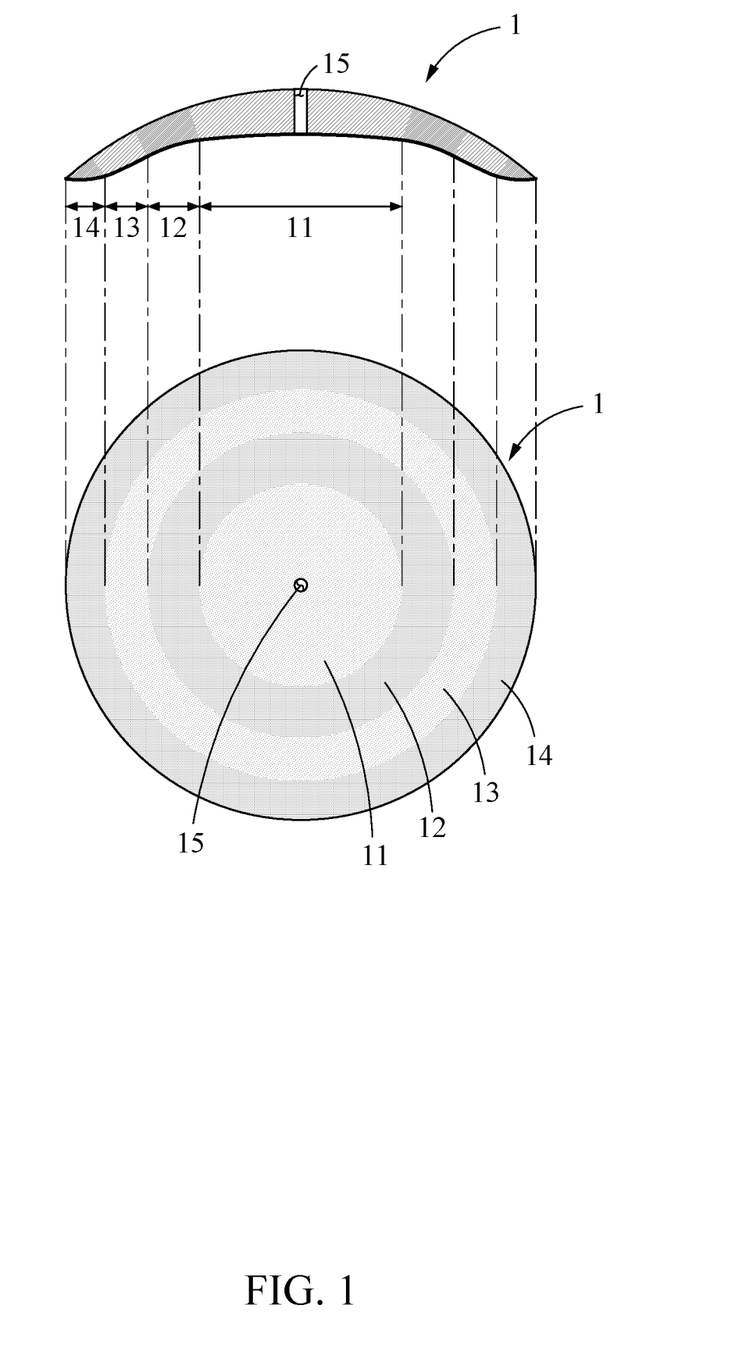
FIG. 1 is a diagram illustrating an orthokerato lens according to a first embodiment.

FIG. 1 is a diagram illustrating an orthokerato lens according to a first embodiment.

Referring to FIG. 1, an orthokerato lens 1 according to the first embodiment may be mounted on an eyeball to correct myopia. For example, if a user sleeps while wearing the orthokerato lens 1, myopia may be corrected during the sleep. Thus, an eyesight improving effect may be obtained even if the user does not wear the lens during daytime or activity. The orthokerato lens 1 may include a central portion 11, a fitting portion 12, a fixing portion 13, a peripheral portion 14, and a circulation hole 15.

The central portion 11 may be located at a center of the lens 1, pressurize a cornea to move corneal epithelia, and change a refractive index. For example, the central portion 11 may have a radius of curvature that is relatively large than those of other portions of the lens 1 to flatten the cornea. The radius of curvature of the central portion 11 may vary based on a shape of the cornea of the user. In the present disclosure, unless otherwise stated, a radius of curvature may refer to a radius of curvature of an inner surface of the lens 1, that is, a surface of the lens 1 facing the cornea, and a radius of curvature of an outer surface of the lens 1 is not necessarily limited as described above. The outer surface of the lens 1 may have an arc shape with a constant radius of curvature as illustrated in FIG. 1.

The fitting portion 12 may form a negative pressure between the lens 1 and the cornea such that the lens 1 is not eliminated from the cornea. The fitting portion 12 may pile corneal epithelial layers pushed by the central portion 11, thereby flattening a central corneal shape overall. The fitting portion 12 may enclose the central portion 11 and have a radius of curvature less than the radius of curvature of the central portion 11. Accordingly, the fitting portion 12 and the cornea may not contact and have a space formed therebetween. The negative pressure may be formed in the space so that the lens 1 is not eliminated from the cornea.

The fixing portion 13 may be in contact with an eyeball and align the lens 1 such that a center of the lens is located at the center of the cornea. The fixing portion 13 may be a portion in contact with a corneal periphery portion of the lens 1 by an appropriate force to stabilize a movement of the lens 1 which is unstable. The fixing portion 13 may have a curvature different from those of other neighboring portions, that is, the central portion 11 and the fitting portion 12, thereby assisting centration. The fixing portion 13 may enclose the fitting portion 12. Based on the lens 1, a center of curvature of the fixing portion 13 may be formed on an opposite side to a center of curvature of the fitting portion 12 and a center of curvature of the central portion 11.

The peripheral portion 14 may allow tears between the lens 1 and the eyeball to circulate. The peripheral portion 14 may be an outward end portion of the lens 1 and have a shape that is slightly lifted from the cornea when the lens 1 is worn. Through this, the peripheral portion 14 may assist the circulation of the tears, assist the lens 1 in moving smoothly, and enhance a comfort of wearing. The peripheral portion 14 may enclose the fixing portion 13. Also, as a distance between the peripheral portion 14 and the fixing portion 13 increases, a distance between the peripheral portion 14 and the cornea may increase. A center of curvature of the peripheral portion 14 may be formed on an opposite side to the center of curvature of the fitting portion 12 and the center of curvature of the central portion 11 based on the lens 1. Also, the peripheral portion 14 may have a radius of curvature less than that of the fixing portion 13. The above-described structure may allow the tears flowing between the fixing portion 13 and the cornea to come out of the lens 1.

The circulation hole 15 may be formed to penetrate the central portion 11. The circulation hole 15 may allow the tears to flow into or come out of the space between the lens 1 and the cornea, thereby preventing adverse effects due to the use of the lens 1. An inward end portion and/or outward end portion of the circulation hole 15 may have, for example, a tapered shape or a rounded shape.

Figure 2:
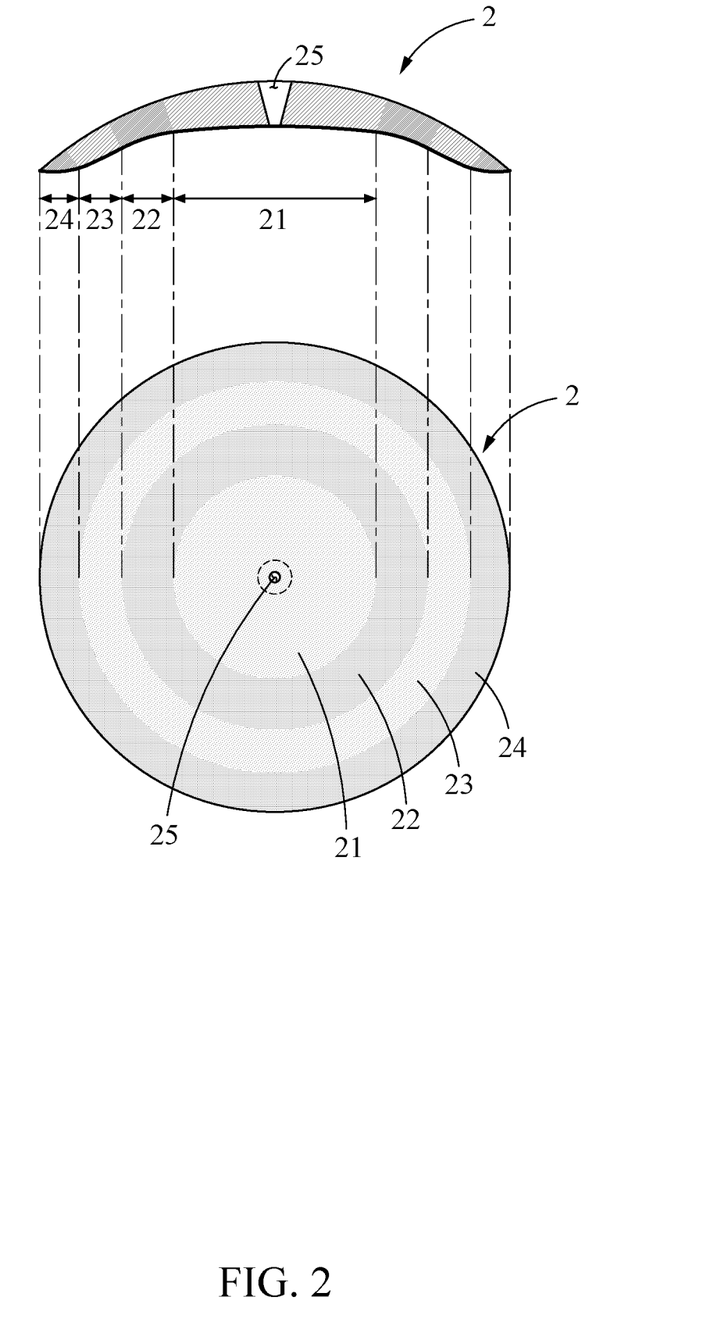
FIG. 2 is a diagram illustrating an orthokerato lens according to a second embodiment.
Figure 3:
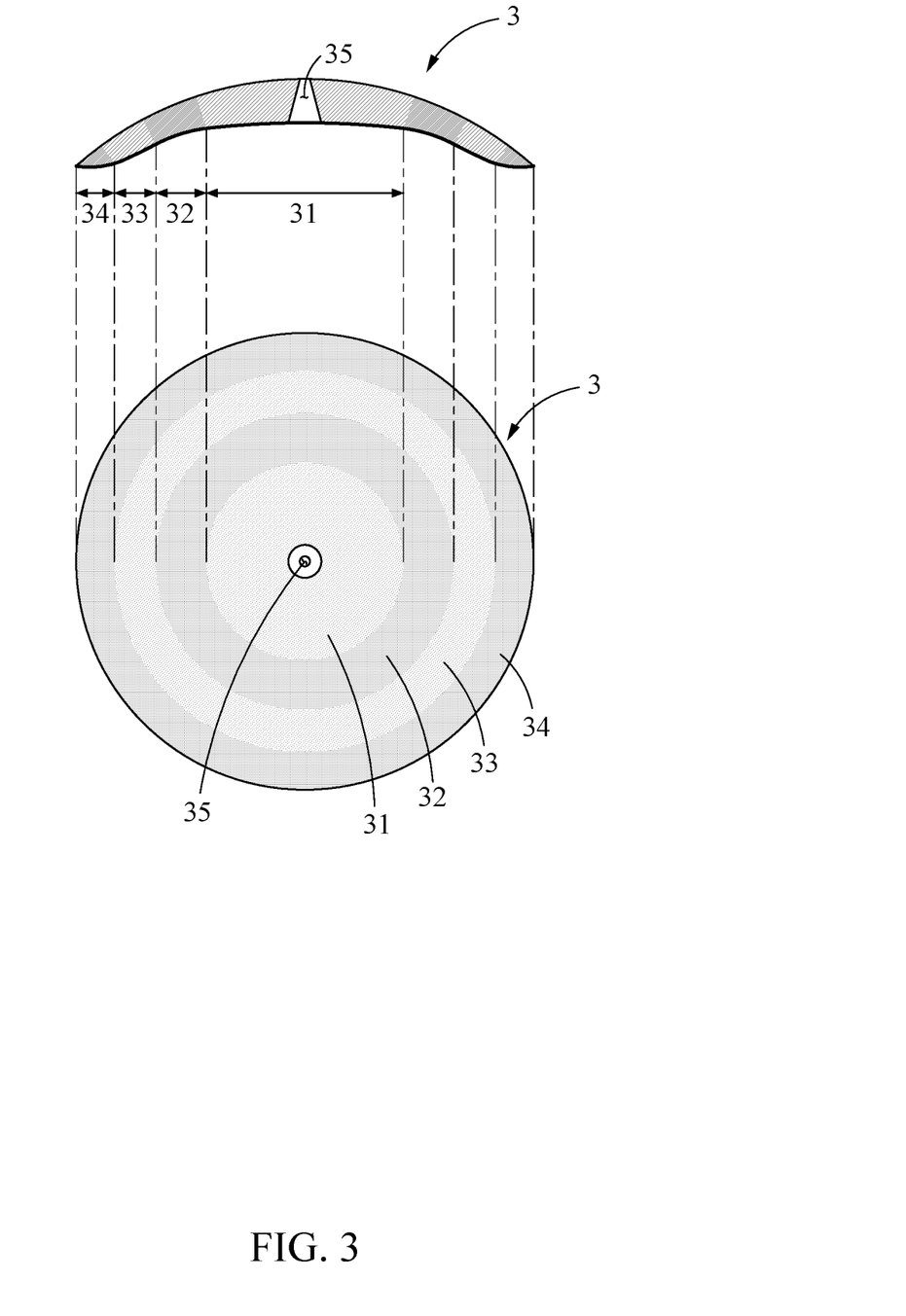
FIG. 3 is a diagram illustrating an orthokerato lens according to a third embodiment.
Figure 4:
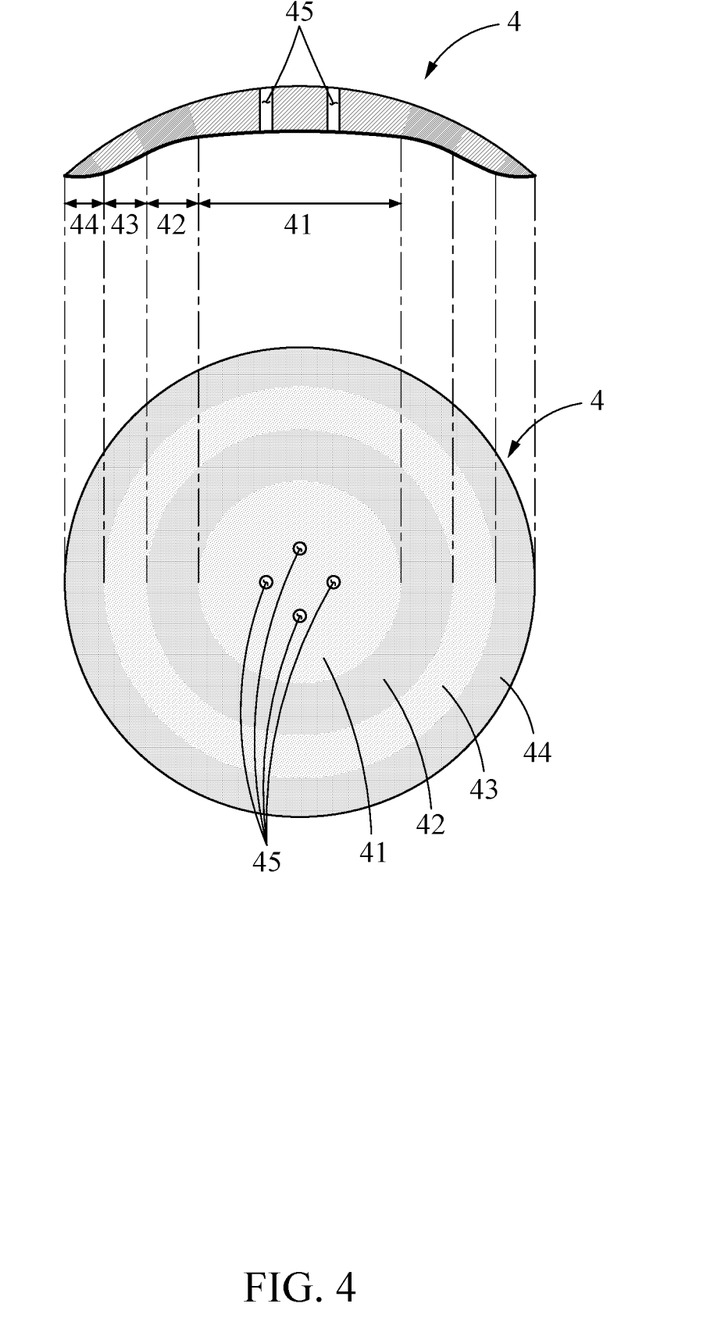
FIG. 4 is a diagram illustrating an orthokerato lens according to a fourth embodiment.
Figure 5:
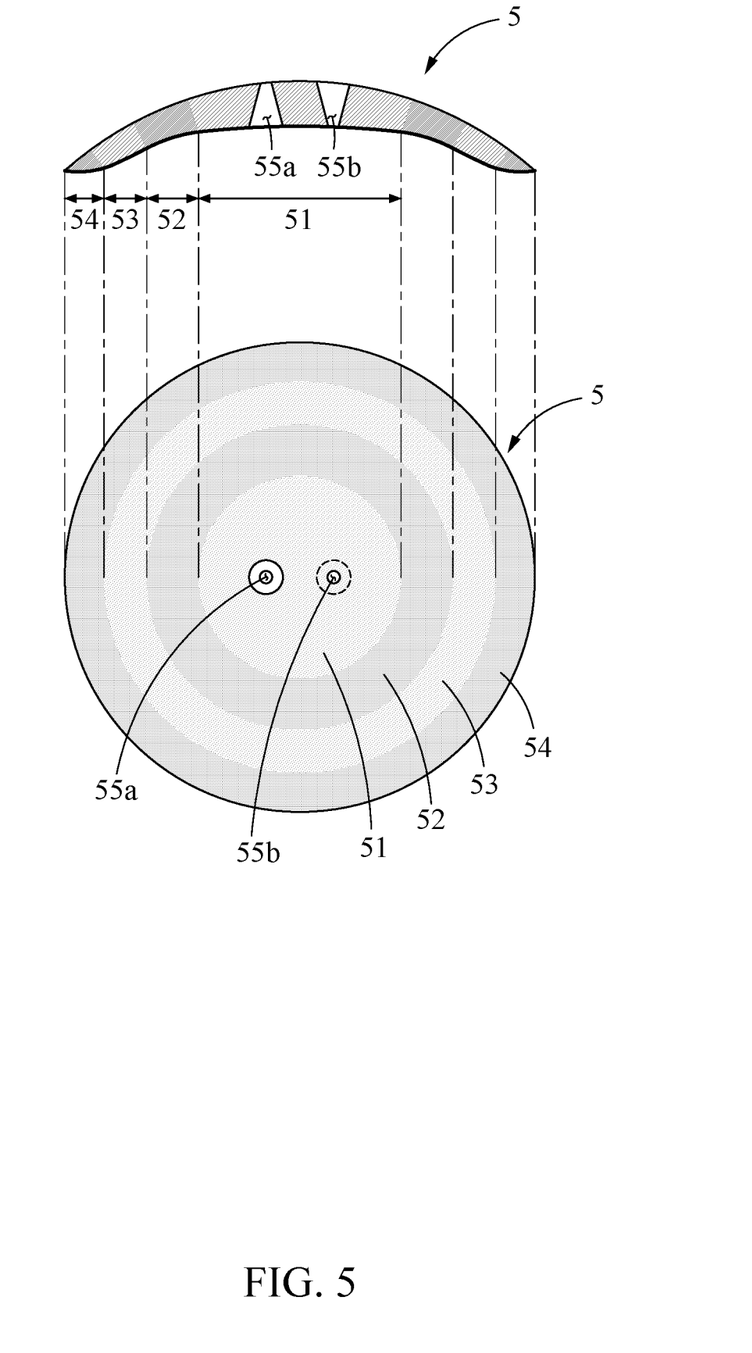
FIG. 5 is a diagram illustrating an orthokerato lens according to a fifth embodiment.

Also, a circulation degree of the tears may be adjusted by adjusting a diameter of the circulation hole 15. For example, as illustrated in FIGS. 1 and 4, the circulation hole 15 may have a shape in which a diameter is uniformed from the outer surface of the lens 1 to the inner surface of the lens 1. Also, as illustrated in FIGS. 2, 3, and 5, the circulation hole 15 may have a diameter changing from the outer surface of the lens 1 toward the lens 1. For each patient, the diameter of the circulation hole 15 may vary based on a degree of myopia or a dryness of the eyeball.

As shown in FIGS. 1 through 3, the circulation hole 15 may be formed at the center of the central portion 11. In other words, the circulation hole 15 may be formed at a portion farthest from the fitting portion 12. Such structure may minimize a problem that the negative pressure formed in the fitting portion 12 is reduced. For example, only one circulation hole 15 may be formed in the entire area of the central portion 11.

In remaining portions other than the central portion 11, for example, the fitting portion 12, the fixing portion 13, and the peripheral portion 14, any hole including the circulation hole 15 may not be formed. In the above structure, by preventing a negative influence on the negative pressure formed through the fitting portion 12, a problem that the lens 1 is eliminated from the cornea and a force for flattening the cornea is reduced may be prevented.

According to the embodiment, in the lens 1, the fitting portion 12 may form a sufficiently high negative pressure and the tears may smoothly circulate through the circulation hole 15 even when the central portion 11 applies a high pressure to the cornea. Therefore, the orthokerato lens may also be used for a patient with high myopia for whom a typical orthokerato lens has not worked.

FIG. 2 is a diagram illustrating an orthokerato lens according to a second embodiment.

Referring to FIG. 2, a lens 2 according to the second embodiment may include a central portion 21, a fitting portion 22, a fixing portion 23, a peripheral portion 24, and a circulation hole 25.

The circulation hole 25 may have a shape in which a diameter decreases from an outer surface of the lens 2 toward an inner surface of the lens 2. The circulation hole 25 may have, for example, a truncated cone shape. The circulation hole 25 in such shape may allow tears flowing from a center of the outer surface of the lens 2 to be introduced into the lens 2 via the circulation hole 25. In such structure, the tears may circulate by flowing into the lens 2 via the circulation hole 25 and coming out of the lens 2 through the peripheral portion 24.

For example, a minimum diameter and/or a maximum diameter of the circulation hole 25 may be adjusted to adjust a circulating speed and a circulation amount of the tears. For each patient, the diameter of the circulation hole 25 may be determined based on a degree of myopia or a dryness of the eyeball.

FIG. 3 is a diagram illustrating an orthokerato lens according to a third embodiment.

Referring to FIG. 3, a lens 3 according to the third embodiment may include a central portion 31, a fitting portion 32, a fixing portion 33, a peripheral portion 34, and a circulation hole 35.

The circulation hole 35 may have a shape in which a diameter increases from an outer surface of the lens 3 toward an inner surface of the lens 3. The circulation hole 35 in such shape may allow tears flowing between a cornea and the lens 3 to come out of an outer surface of the lens 3 via the circulation hole 35. In such structure, the tears introduced into the lens 3 by the peripheral portion 34 may come out of the lens 3 via the circulation hole 35 to circulate.

FIG. 4 is a diagram illustrating an orthokerato lens according to a fourth embodiment.

Referring to FIG. 4, a lens 4 according to the fourth embodiment may include a central portion 41, a fitting portion 42, a fixing portion 43, a peripheral portion 44, and a plurality of circulation holes 45.

The plurality of circulation holes 45 may be formed in the central portion 41 only. For example, the plurality of circulation holes 45 may be formed to be radially symmetric based on a center of the central portion 41. Although FIG. 4 illustrates that four circulation holes 45 are symmetrically formed at intervals of 90 degrees)(° based on the center of the central portion 41, the number of the circulation holes 45 and the interval between the circulation holes 45 are not limited thereto. Such structure may prevent the tears from stagnating at one side based on the center of the central portion 41 and assist the tears in uniformly flowing in the entire area of the lens 4.

FIG. 5 is a diagram illustrating an orthokerato lens according to a fifth embodiment.

Referring to FIG. 5, a lens 5 according to the fifth embodiment may include a central portion 51, a fitting portion 52, a fixing portion 53, a peripheral portion 54, and a plurality of circulation holes 55a and 55b.

The plurality of circulation holes 55a and 55b may include a first circulation hole, for example, the circulation hole 55b of which a diameter decreases toward an inner surface of the lens 5 and a second circulation hole, for example, the circulation hole 55a of which a diameter increases toward the inner surface of the lens 5. For example, tears flowing on an outer surface of the lens 5 may flow into the lens 5 via at least one of the first circulation hole 55b and the peripheral portion 54. Also, the tears may come out of the lens 5 via at least one of the second circulation hole 55a and the peripheral portion 54. In the above structure, a tear circulating path may be pluralized, which may reduce a tear stagnating section. Through this, side effects such as hypoxia may be effectively prevented.

Figure 6:
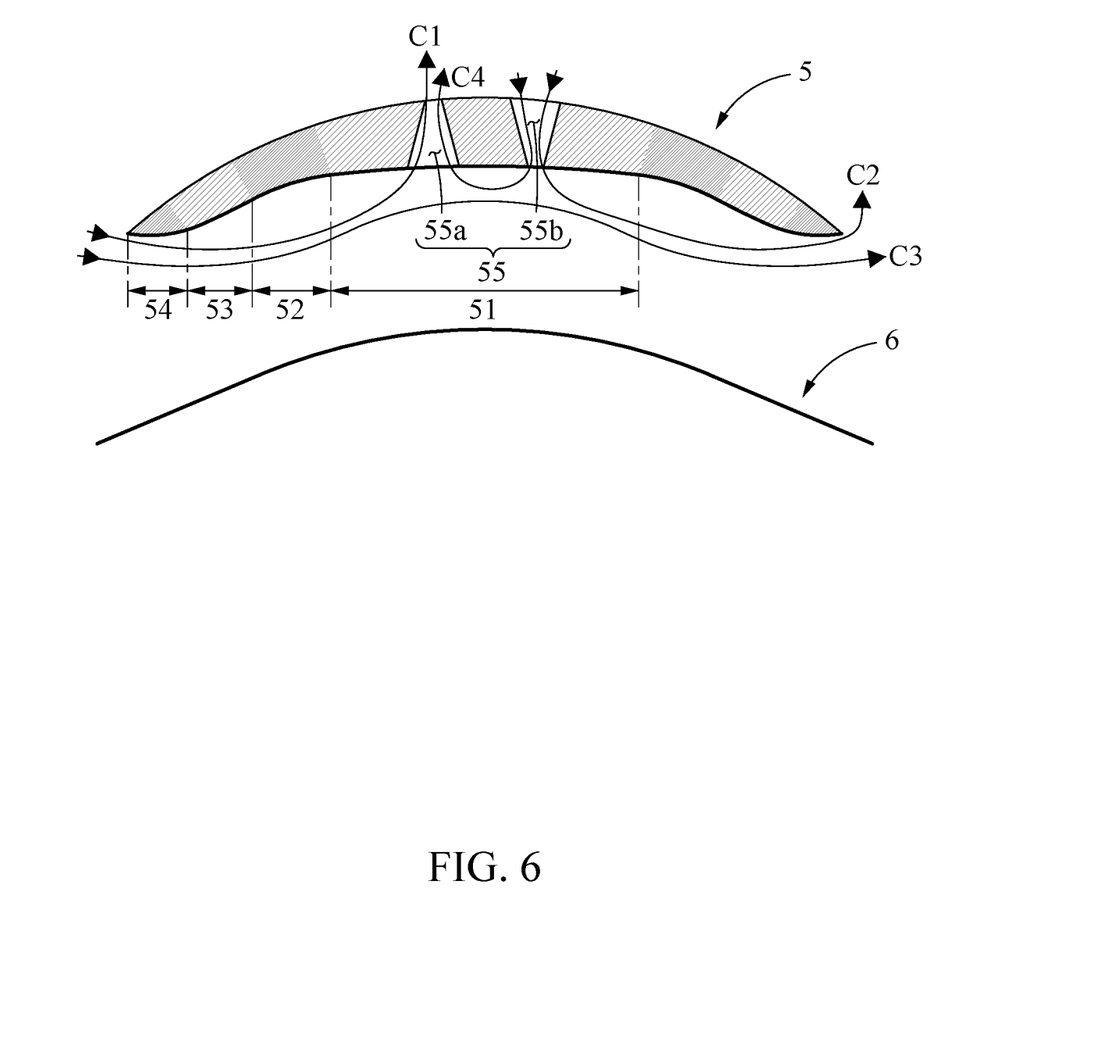
FIG. 6 is a diagram illustrating a path through which tears circulate via a circulation hole of an orthokerato lens according to an example embodiment.

FIG. 6 is a diagram illustrating a path through which tears circulate via a circulation hole of an orthokerato lens according to an example embodiment.

Referring to FIG. 6, a circulating path through which tears circulate via a circulation hole 55 and a peripheral portion 54 may be pluralized between a lens 5 and an eyeball 6. For example, the circulating path may include a first path C1, a second path C2, a third path C3, and a fourth path C4. Here, as described with reference to FIGS. 2 through 5, a larger amount of tears may move via one circulation hole (e.g., a second circulation hole 55a and a first circulation hole 55b) in one of inflow and outflow directions based on a shape of a cross-section. For example, an inflow and an outflow of the tears may be simultaneously performed through the peripheral portion 54. In this example, based on a fluid pressure in a space between the lens 5 and the eyeball 6, a larger amount of tears may move in one of the inflow and outflow directions.

The first path C1 may be a path through which tears flow into a space between the lens 5 and the eyeball 6 via the peripheral portion 54 and come out via the second circulation hole 55a. For example, when a diameter of the second circulation hole 55a increases toward the inner surface of the lens 5, the tears may move along the first path C1.

The second path C2 may be a path through which tears flow into a space between the lens 5 and the eyeball 6 via the first circulation hole 55b and come out via the peripheral portion 54. For example, when the diameter of the first circulation hole 55b decreases toward the inner surface of the lens 5, the tears may move along the second path C2.

The third path C3 may be a path through which tears flow into a space the lens 5 and the eyeball 6 via the peripheral portion 54 and come out via the peripheral portion 54. For example, the tears flowing not through the circulation holes 55a and 55b may move along the third path C3.

The fourth path C4 may be a path through which tears flow into a space between the lens 5 and the eyeball 6 via the first circulation hole 55b and come out via the second circulation hole 55a. For example, when the circulation hole 55 is formed in plural, the tears flowing not through the peripheral portion 54 may move along the fourth path C4.

Meanwhile, when the circulation hole 55 has a shape in which the diameter is uniformed from the outer surface of the lens 5 to the inner surface of the lens 5, a circulation path may not be determined based on a shape of the lens 5. In this case, the tears may circulate through a random path in which the first path to the fourth path are combined.

A number of example embodiments have been described above. Nevertheless, it should be understood that various modifications may be made to these example embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An orthokerato lens comprising:
    a central portion located on a center of a lens and configured to change a refractive index by pressurizing a cornea;
    a fitting portion configured to form a negative pressure between the lens and the cornea to pile epithelial cells moved from the central portion;
    a fixing portion configured to be in contact with an eyeball and align the lens such that the center of the lens is located at a center of the cornea;
    a peripheral portion having a center of curvature that is formed on an opposite side to a center of curvature of the fitting portion and a center of curvature of the central portion based on the lens and having a radius of curvature that is less than a radius of curvature of the fixing portion; and
    a circulation hole configured to penetrate the central portion,
    wherein a circulating path through which the tears circulate via the circulation hole and the peripheral portion is pluralized between the lens and the eyeball,
    wherein the circulating path comprises:
    a first path through which the tears flow into a space between the lens and the eyeball via the peripheral portion and come out via the circulation hole; and
    a second path through which the tears flow into a space between the lens and the eyeball via the circulation hole and come out via the peripheral portion.

2. The orthokerato lens of claim 1, wherein the circulation hole has a shape in which a diameter decreases from an outer surface of the lens toward an inner surface of the lens.

3. The orthokerato lens of claim 1, wherein the circulation hole has a shape in which a diameter increases from an outer surface of the lens toward an inner surface of the lens.

4. The orthokerato lens of claim 1, wherein the circulation hole has a shape in which a diameter is uniformed from an outer surface of the lens to an inner surface of the lens.

5. The orthokerato lens of claim 1, wherein the circulating path further comprises:
    a third path through which the tears flow into and come out of the space between the lens and the eyeball via the peripheral portion.

6. The orthokerato lens of claim 5, wherein a plurality of circulation holes is formed to be symmetric based on a center of the central portion, and
    the circulating path further comprises:
    a fourth path through which the tears flow into and come out of the space between the lens and the eyeball via the plurality of circulation holes.

7. An orthokerato lens comprising:
    a central portion located on a center of a lens and configured to change a refractive index by pressurizing a cornea;
    a fitting portion configured to form a negative pressure between the lens and the cornea to pile epithelial cells moved from the central portion;
    a fixing portion configured to be in contact with an eyeball and align the lens such that the center of the lens is located at a center of the cornea;
    a peripheral portion having a center of curvature that is formed on an opposite side to a center of curvature of the fitting portion and a center of curvature of the central portion based on the lens and having a radius of curvature that is less than a radius of curvature of the fixing portion; and
    a circulation hole configured to penetrate the central portion,
    wherein the circulation hole comprises:
    a first circulation hole having a shape in which a diameter gradually decreases from an outer surface of the lens toward an inner surface of the lens, to guide the tears from the outer surface of the lens toward the cornea; and
    a second circulation hole having a shape in which a diameter gradually increases from the outer surface of the lens toward the inner surface of the lens, to guide the tears from the cornea toward the outer surface of the lens,
    the tears flow into the lens via at least one of the first circulation hole and the peripheral portion, and the tears come out of the lens via at least one of the second circulation hole and the peripheral portion.

8. The orthokerato lens of claim 1, wherein a hole is not formed in the fitting portion, the fixing portion, and the peripheral portion.

9. The orthokerato lens of claim 7, wherein a hole is not formed in the fitting portion, the fixing portion, and the peripheral portion.

* * * * *